(12) United States Patent
Metz

(10) Patent No.: US 9,777,837 B2
(45) Date of Patent: Oct. 3, 2017

(54) APPARATUS AND METHOD FOR SEALING A DOCK LEVELER ASSEMBLY

(75) Inventor: Donald L. Metz, Kirkville, NY (US)

(73) Assignee: DL Manufacturing, North Syracuse, NY (US)

( * ) Notice: Subject to any disclaimer, the term of this patent is extended or adjusted under 35 U.S.C. 154(b) by 824 days.

(21) Appl. No.: 14/343,230

(22) PCT Filed: Sep. 6, 2012

(86) PCT No.: PCT/US2012/053956
§ 371 (c)(1),
(2), (4) Date: Jun. 18, 2014

(87) PCT Pub. No.: WO2013/036634
PCT Pub. Date: Mar. 14, 2013

(65) Prior Publication Data
US 2014/0367927 A1    Dec. 18, 2014

Related U.S. Application Data

(60) Provisional application No. 61/651,347, filed on May 24, 2012, provisional application No. 61/531,470, filed on Sep. 6, 2011.

(51) Int. Cl.
*B65G 69/00* (2006.01)
*F16J 15/02* (2006.01)

(52) U.S. Cl.
CPC .......... *F16J 15/022* (2013.01); *B65G 69/008* (2013.01)

(58) Field of Classification Search
CPC ................................ F16J 15/022; B65G 69/00
USPC .................................................. 14/69.5–72.5
See application file for complete search history.

(56) References Cited

U.S. PATENT DOCUMENTS

| | | | |
|---|---|---|---|
| 3,303,615 A * | 2/1967 | O'Neal ............... | B65G 69/008 135/117 |
| 4,574,543 A | 3/1986 | Crosson | |
| 5,442,825 A | 8/1995 | Hahn et al. | |
| 6,073,402 A | 6/2000 | Moody | |
| 9,327,922 B2 * | 5/2016 | Eungard ............. | B65G 69/008 |
| 2003/0005530 A1 | 1/2003 | Digmann et al. | |

(Continued)

OTHER PUBLICATIONS

The International Bureau of WIPO, International Preliminary Report on Patentability for Corresponding International Application No. PCT/US2012/053956, date of mailing Mar. 20, 2014 (11 pgs).

*Primary Examiner* — Raymond W Addie
(74) *Attorney, Agent, or Firm* — Harris Beach PLLC

(57) ABSTRACT

A sealing device for use in sealing a gap formed by the interface between the floor, the dock leveler assembly, and a parked vehicle cargo frame includes a base portion having a bottom surface, an inner vertical surface, and a rear vertical surface. The bottom surface is adapted for sealing engagement with a loading dock floor. The sealing device further includes a first brush portion secured to the rear vertical surface of the base portion. The first brush portion includes a plurality of bristles and is adapted for sealing engagement with a vehicle cargo frame. The sealing device further includes a second brush portion secured to the inner vertical surface of the base portion. The second brush portion includes a plurality of bristles and is adapted for sealing engagement with an underside of the lip of a dock leveler assembly when the lip is in an extended position.

19 Claims, 13 Drawing Sheets

(56) References Cited

U.S. PATENT DOCUMENTS

2009/0126130 A1    5/2009  Bettendorf et al.
2015/0007512 A1*   1/2015  Digmann ............... E04H 14/00
                                                    52/173.2
2017/0057764 A1*   3/2017  Digmann ............. B65G 69/008
                                                    14/69.5

* cited by examiner

APPARATUS AND METHOD FOR SEALING A DOCK LEVELER ASSEMBLY

CROSS REFERENCE TO RELATED APPLICATION

This application is filed pursuant to 35 U.S.C. §371 as a United States National Phase Application of International Application Ser. No. PCT/US2012/053956, which claims priority from and the benefit of U.S. Provisional Application Ser. No. 61/531,470, filed Sep. 6, 2011, entitled "METHOD AND APPARATUS FOR SEALING A DOCK LEVERLER ASSEMBLY", and U.S. Provisional Application Ser. No. 61/651,347, filed May 24, 2012, entitled "APPARATUS FOR SEALING A DOCK LEVELER ASSEMBLY", which applications are incorporated herein in their entirety by reference.

FIELD OF THE INVENTION

This disclosure relates generally to sealing devices for loading docks and, more specifically, to a device for sealing the gap between a loading dock floor, a leveler assembly, and a trailer parked at the loading dock.

BACKGROUND OF THE INVENTION

A loading dock for a vehicle such as a trailer truck or box truck commonly includes an overhead door frame of a width and height sufficient to accommodate the interior region of the trailer cargo area. When the overhead door is closed, the truck backs towards the loading dock until the rear of the cargo compartment engages the dock. The cargo compartment of the truck is thus roughly aligned with the opening of the loading dock. The truck may have an overhead door or, more commonly, hinged panel doors that swing open and are stowed against the side of the trailer.

Dock levelers are utilized to compensate for height differences between a dock platform and the bed of the parked vehicle to permit forklift trucks and personnel to readily move on and off the vehicle during loading and unloading operations. A typical dock leveler is mounted within a pit and has a deck pivotally connected at its rear edge to a frame mounted within the pit for varying the height of the dock leveler in order to compensate for the height differences. An extension plate or lip is typically pivotally connected to the front edge of the deck for spanning the distance between the rear end of the vehicle bed and the outer front end of the deck and permitting forklift trucks and personnel to safely load and unload the truck without difficulty.

The deck is adapted to pivot between downwardly inclined or lowered positions, a horizontal or level position, and upwardly inclined or raised positions relative to the dock platform. When the dock leveler is not in use, the deck is substantially coplanar with the adjacent, upper surface of the dock. To permit such movement of the deck, a gap is typically formed along the adjacent edges of the deck and loading dock floor.

The loading dock includes a bumper system to cushion the impact of the rear of the vehicle making contact with the dock. Typically, a bumper system includes two bumpers, one on either side of the leveler pit. The bumper is secured to a vertical wall of the loading dock, just below the floor level. The bumper is made from laminated strips of rubber and extends away from the wall about twelve inches.

Sealing the cargo area of the vehicle from outdoor environmental conditions can be an important requirement of a loading dock structure, particularly when the cargo and the receiving dock are refrigerated. To address this need, dock seals and dock shelters have been designed to prevent the ingress of outdoor environmental conditions or contaminants (e.g., rain, snow, wind, hot/cold temperatures, insects, animals, etc.) into the interior of the dock area and cargo area of the vehicle during the loading or unloading of the vehicle. Dock shelters and dock seals also address the need to prevent the egress of refrigerated air from within the loading bay and/or vehicle cargo area to the outdoor environment. Typically, dock seals and dock shelters include vertical side members along both sides of the loading bay door and a horizontal header extending across the top of the door. Because the dock leveler pit is deeper than the rear cargo frame of the vehicle, dock seal and dock shelter systems do not include lower horizontal sealing members.

SUMMARY OF THE INVENTION

Although the traditional dock leveler system combined with a dock seal or dock shelter can be useful and may be advantageous for certain applications, it suffers from drawbacks. One drawback to the current system is that the absence of a lower horizontal sealing member still allows significant leakage between the cargo area of the truck and the loading dock door.

In one aspect of the invention, a loading dock includes a floor, a door frame, a pit, a dock leveler assembly, and a dock bumper extending longitudinally away from the floor. The pit includes a pit floor, pit side walls, and a pit rear wall. The dock leveler assembly includes a deck, a lip connected to the deck, and a toe guard vertically coupled to the deck. Provided is a sealing device for use in sealing a gap formed by the interface between the floor, the dock leveler assembly, and a parked vehicle cargo frame. The sealing device includes a base portion having a bottom surface, an inner vertical surface, and a rear vertical surface. The bottom surface is adapted for sealing engagement with the loading dock floor. The sealing device further includes a first brush portion secured to the rear vertical surface of the base portion. The first brush portion includes a plurality of bristles and is adapted for sealing engagement with the vehicle cargo frame. The sealing device further includes a second brush portion secured to the inner vertical surface of the base portion. The second brush portion includes a plurality of bristles and is adapted for sealing engagement with an underside of the lip of the dock leveler assembly when the lip is in an extended position.

In another aspect of the invention, a method for sealing a gap formed by the interface between the floor, the dock leveler assembly, and a parked vehicle cargo frame is provided. The method includes the step of providing a sealing device comprising a bottom surface, an inner vertical surface adapted for sealing engagement with an underside of the lip of the dock leveler assembly when the lip is in an extended position, and a rear vertical surface adapted for sealing engagement with the vehicle cargo frame. The method further includes the steps of effecting a first seal by positioning the bottom surface of the sealing device in sealing engagement with the loading dock floor, positioning the vehicle cargo frame against the dock bumper, effecting a second seal by engaging the inner vertical surface of the sealing device against the underside of the lip of the dock leveler, and effecting a third seal by engaging the rear vertical surface of the sealing device against the vehicle cargo frame.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
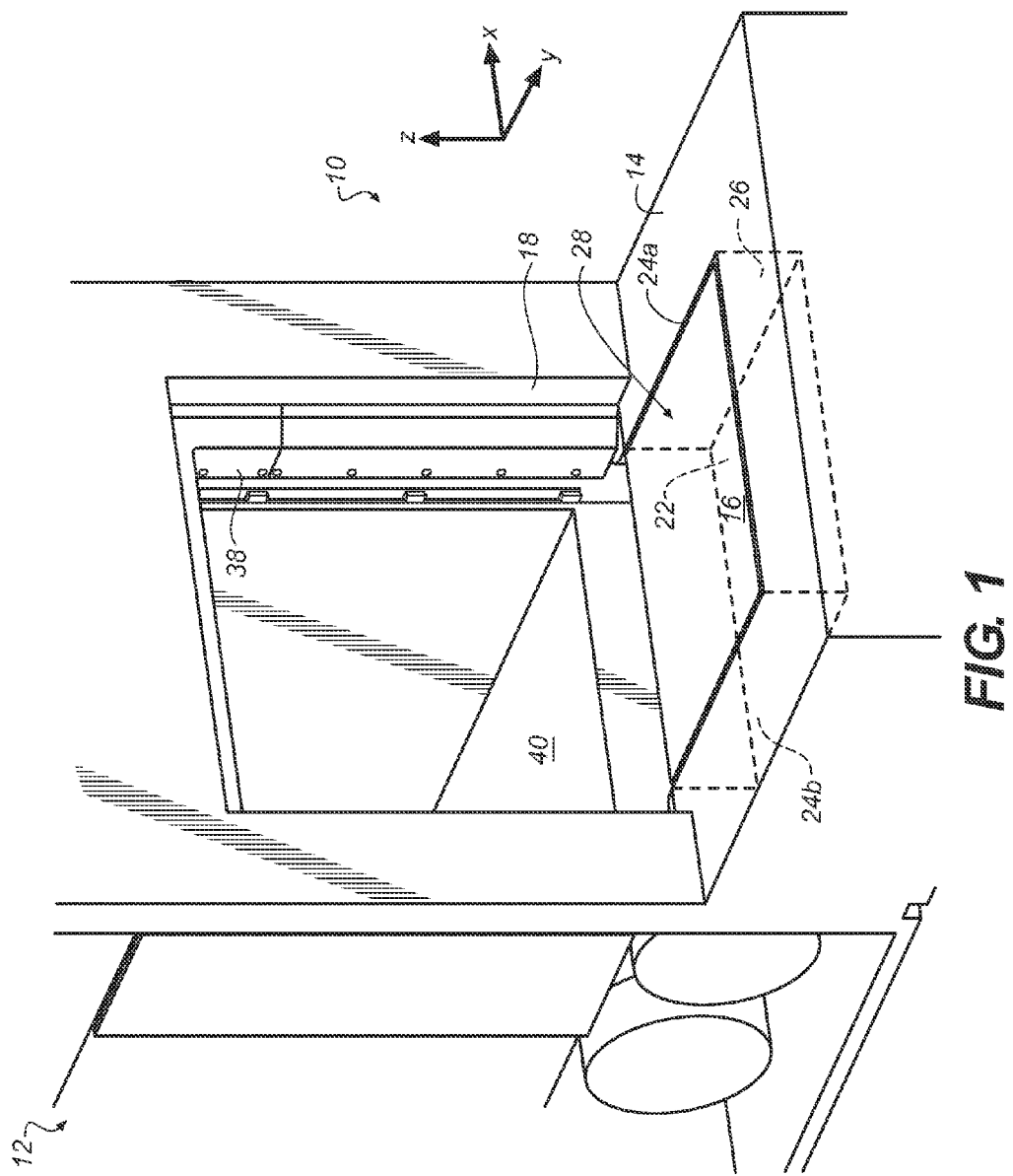
FIG. 1 is a top perspective view, from inside a building, of a loading dock and vehicle.
Figure 2:
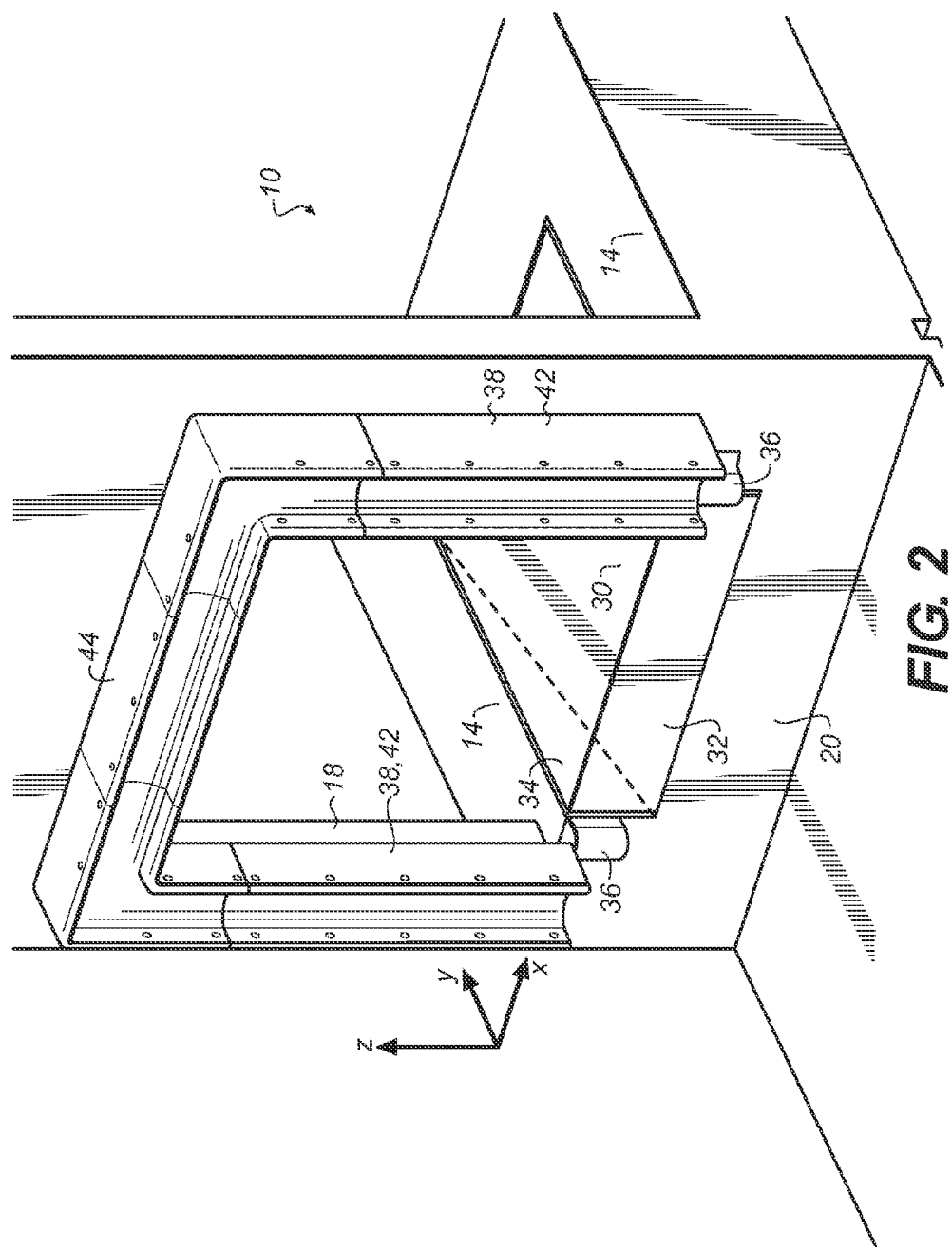
FIG. 2 is a top perspective view, from outside the building, of the loading dock of FIG. 1 with the vehicle removed for clarity.

Referring to FIGS. 1 and 2, perspective views of a loading dock 10 and vehicle 12 are shown. The loading dock 10 includes a loading surface or floor 14 and a recess or pit 16 (shown in dashed lines). The floor 14 extends longitudinally in the loading dock door frame 18 to a loading dock wall 20 which is typically the outside wall of the building. The pit 16 is an open structure defined by a pit floor 22, pit side walls 24a, 24b, and pit rear wall 26.

For purposes of illustration and to further explain orientation of certain features of the invention, a lateral axis is defined as substantially parallel to the loading dock wall and is denoted as the x-axis; a longitudinal axis is defined as substantially in the direction of vehicle motion when backing into the loading dock and is denoted as the y-axis; and the vertical axis is denoted as the z-axis.

A dock leveler assembly 28 mounted within the pit 16 compensates for the vertical height difference between the floor 14 and the bed of the parked vehicle 12 and to span the longitudinal distance which frequently occurs between the loading dock floor 14 and the bed of the vehicle 12. The dock leveler assembly 28 includes a frame (not shown) mounted to the pit floor 22. A ramp or deck 30 is pivotally connected to the frame at the rear of the pit 16 so that the deck 30 can pivot between lowered, level and raised positions. An extension plate or lip 32 (shown in the retracted position) is pivotally connected to a front face of the frame or deck. The deck 30 is typically rectangular in shape and covers the open top of the pit 16 and is adapted to be approximately flush with the dock floor 14 when the deck is not in use. The deck 30 may be actuated upwards and downwards by a spring-loaded lifting system, a hydraulic lifting system, or other conventional means.

The dock leveler assembly 28 further includes a toe guard 34 on both sides of the deck 30. The toe guard 34 is typically a vertically-oriented steel plate extending downward into the pit 16 from the longitudinal edge of the leveler deck 30. In the illustrated example, the toe guard 34 is triangle-shaped. The toe guard 34, as the name implies, prevents a foot or other body part from being trapped underneath the deck 30 when the deck is in the raised position.

The loading dock 10 further includes bumpers 36 positioned against the dock wall 20 to either side of the pit 16, extending longitudinally away from the dock floor 14 approximately twelve inches. The bumpers 36 are engaged by the rear frame or bumper of the vehicle 12 when the vehicle is backed into a parked position relative to the dock leveler assembly 28. The bumpers 36 prevent the vehicle 12 from striking and damaging the dock wall 20 and the various components of the dock leveler assembly 28.

In operation, when the dock leveler assembly 28 is being adjusted to accommodate the bed of a parked vehicle, the deck 30 is normally pivoted upwardly so that the lip 32 will clear the rear end of the parked vehicle before it is pivoted outwardly to an extended position. Once the lip 32 has assumed its extended position, the deck 30 and lip are lowered as a unit until the lip rests upon the top surface inside the vehicle bed. The lip 32 allows a forklift truck and dock personnel to readily move between the deck 30 and the vehicle bed. The lip 32 spans the lateral distance between the bumpers 36 and is preferably formed of steel plate and thus capable of withstanding substantial loads. When the loading dock 10 is not in use, the deck 30 normally assumes a horizontal position wherein the exposed top surface of the deck is substantially coplanar with the loading dock floor 14.

FIG. 2 illustrates a dock seal 38 adapted to seal a vehicle cargo area 40 to the loading dock 10. The dock seal 38 includes vertical side members 42 along both sides of the loading bay door and a horizontal header 44 extending across the top of the door. Further description of the dock seal 38 is provided in commonly owned U.S. patent application Ser. No. 61/522,007 entitled "SEALING DEVICE FOR USE WITH LOADING DOCK" filed on Aug. 10, 2011, which is hereby incorporated herein by reference in its entirety.

Figure 3:
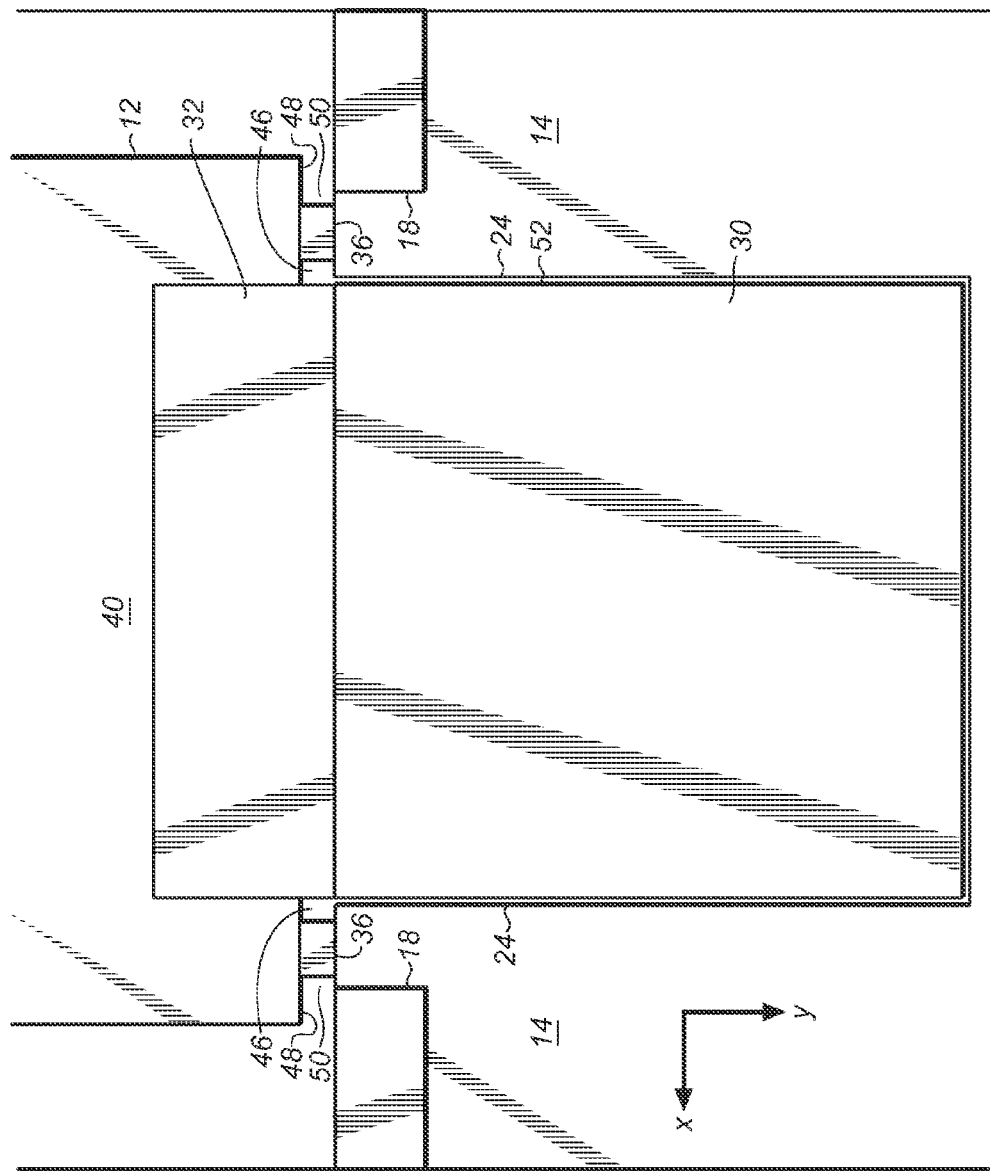
FIG. 3 is a top cross sectional view of the loading dock of FIG. 1, showing the vehicle in the parked position and the dock leveler extended into the cargo area of the vehicle.

Turning to FIG. 3, a top view of the loading dock 10 is shown, sectioned approximately mid-way through the trailer section of the vehicle 12. FIG. 3 illustrates one problem encountered with sealing a vehicle's cargo area to a conventional loading dock. Specifically, dock shelters and dock seals do not seal across the bottom horizontal surfaces, underneath the lip 32 of the deck 30, especially in the area between the dock bumpers 36.

The inventor of the present disclosure has discovered there are zones of leakage between the vehicle and the dock, even when the dock seal 38 (or a conventional dock shelter) is properly engaged to the rear frame of the vehicle. A first, primary leakage zone 46 is defined by an area between the loading dock floor 14 and a rear cargo frame 48 of the vehicle 12, between the bumper 36 and the deck 30 of the leveler assembly 28. A clear pathway is formed from outdoor conditions underneath the bumpers 36 and the deck 30 upwards through the primary leakage zone 46 and into the conditioned environment of the loading dock 10 and vehicle cargo area 40. The leakage zone 46 exists because the back or rear cargo frame 48 of the vehicle 12 can only park as close to the loading dock 10 as the bumpers 36 allow. Thus, an open pathway or leakage zone 46 exists from the longitudinal edge of the bumper 36 to the longitudinal edge of the dock deck 30. Even if the longitudinal edge of the bumper 36 was adapted to be flush with the pit side wall 24, there still exists a gap or leakage zone 46 that is laterally as wide as the space between the pit side wall 24 and the toe guard 34 of the deck 30, extending in a longitudinal direction the entire length or projection of the bumper 36.

To a lesser but not insignificant extent, a secondary leakage zone 50 is defined by an area between the loading dock floor 14 and the vehicle cargo frame 48, between the bumper 36 and the door frame 18. A clear pathway is formed from outdoor conditions underneath the bumpers 36 upwards through the secondary leakage zone 50 to the conditioned environment of the loading dock 10 and vehicle cargo area 40. The secondary leakage zone 50 exists because the back or rear cargo frame 48 of the vehicle 12 can only park as close to the loading dock 10 as the bumpers 36 allow. Thus, an open pathway or leakage zone 50 exists from the longitudinal edge of the bumper 36 to the door frame 18. The secondary leakage zone 50 may be mitigated to some extent by extending the side of the bumper 36 to meet the door frame 18, but in most dock configurations this solution is impractical because the bumper is already installed and does not form a sealing surface.

Prior art dock leveler weather seals have attempted to seal the gap 52 between the toe guard wall 34 and the pit side wall 24 by placing a resilient and compressible seal body against either the deck side or pit wall, in the pit below floor level. Although such dock leveler weather seals can be useful and may be advantageous for certain applications, they fail to address the leakage zones 46, 50 that exist beyond the outside edge of the dock floor 14.

Figure 4:
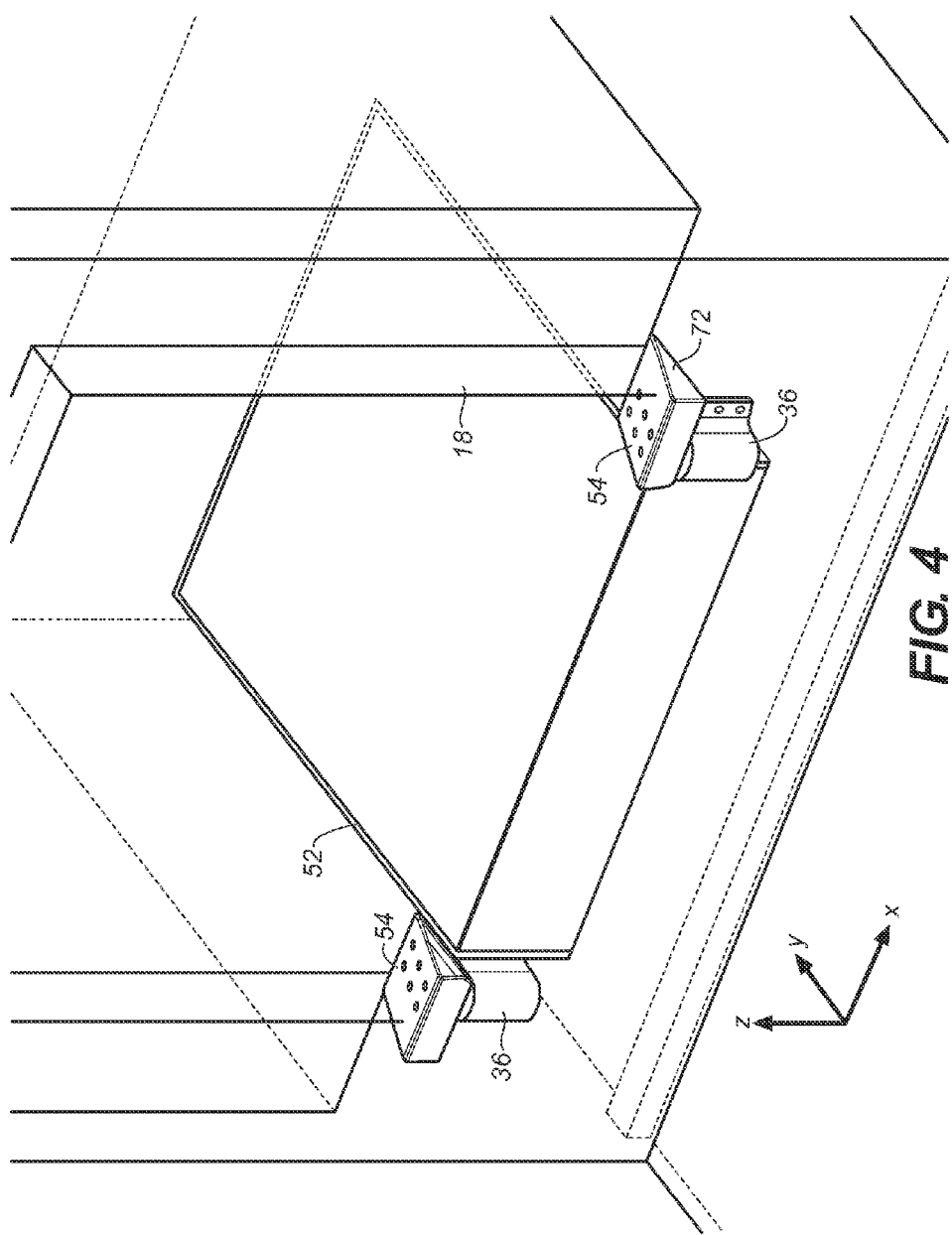
FIG. 4 is a top perspective view, from outside the building with the dock seal removed for clarity, of a sealing device according to one embodiment of the invention.
Figure 5:
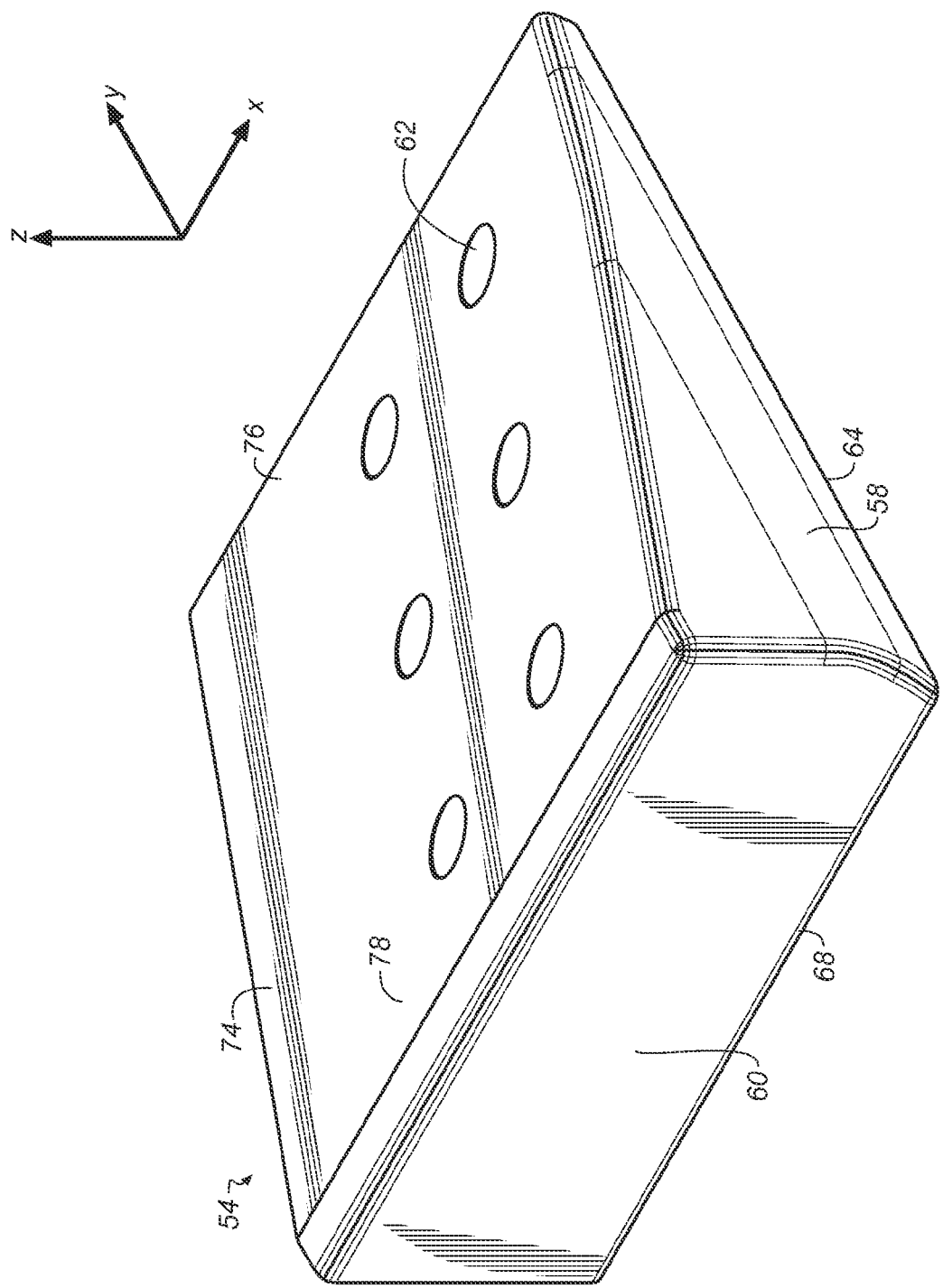
FIG. 5 is a top perspective view of the sealing device shown in FIG. 4.
Figure 6:
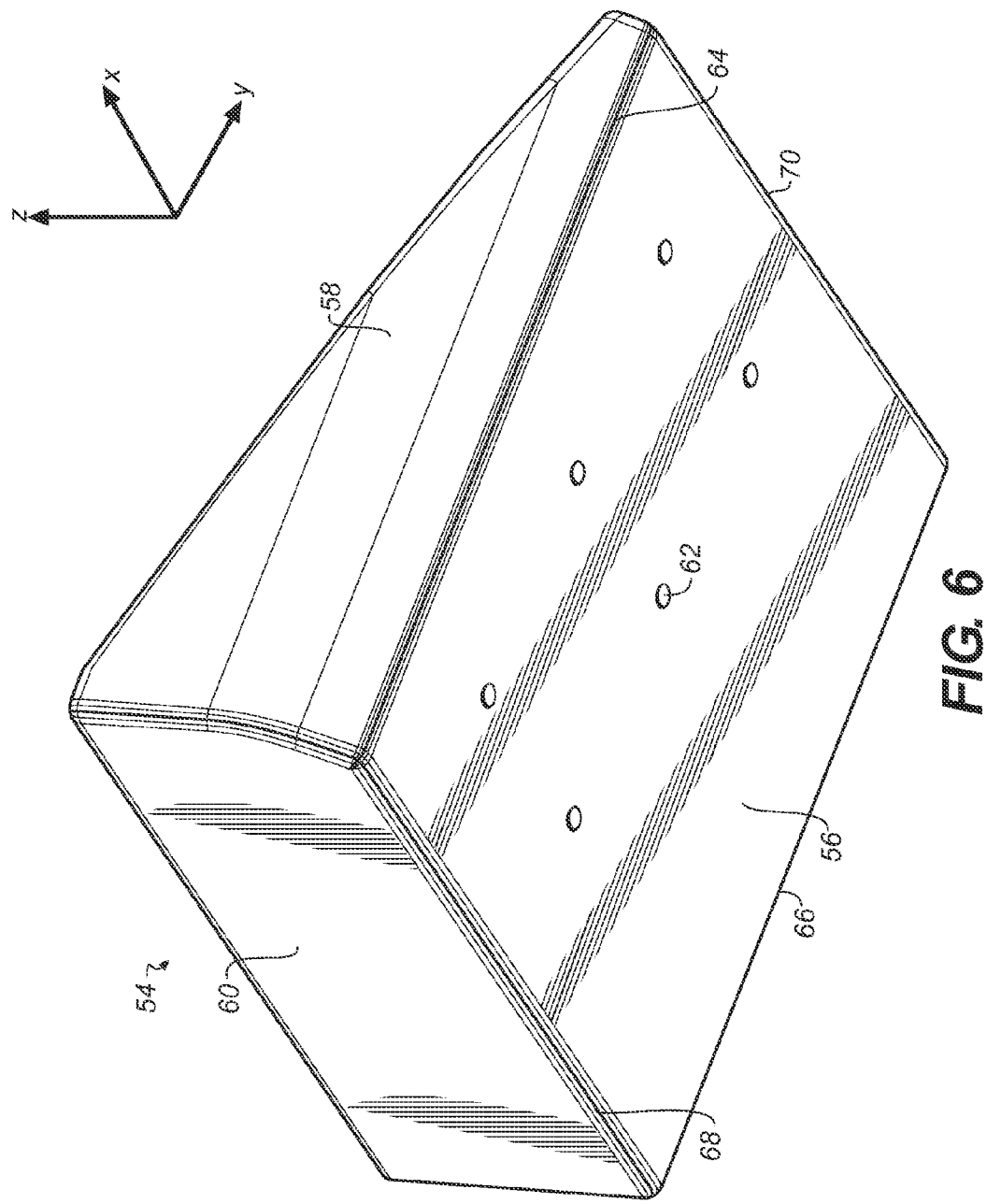
FIG. 6 is a bottom perspective view of the sealing device shown in FIG. 4.
Figure 7:
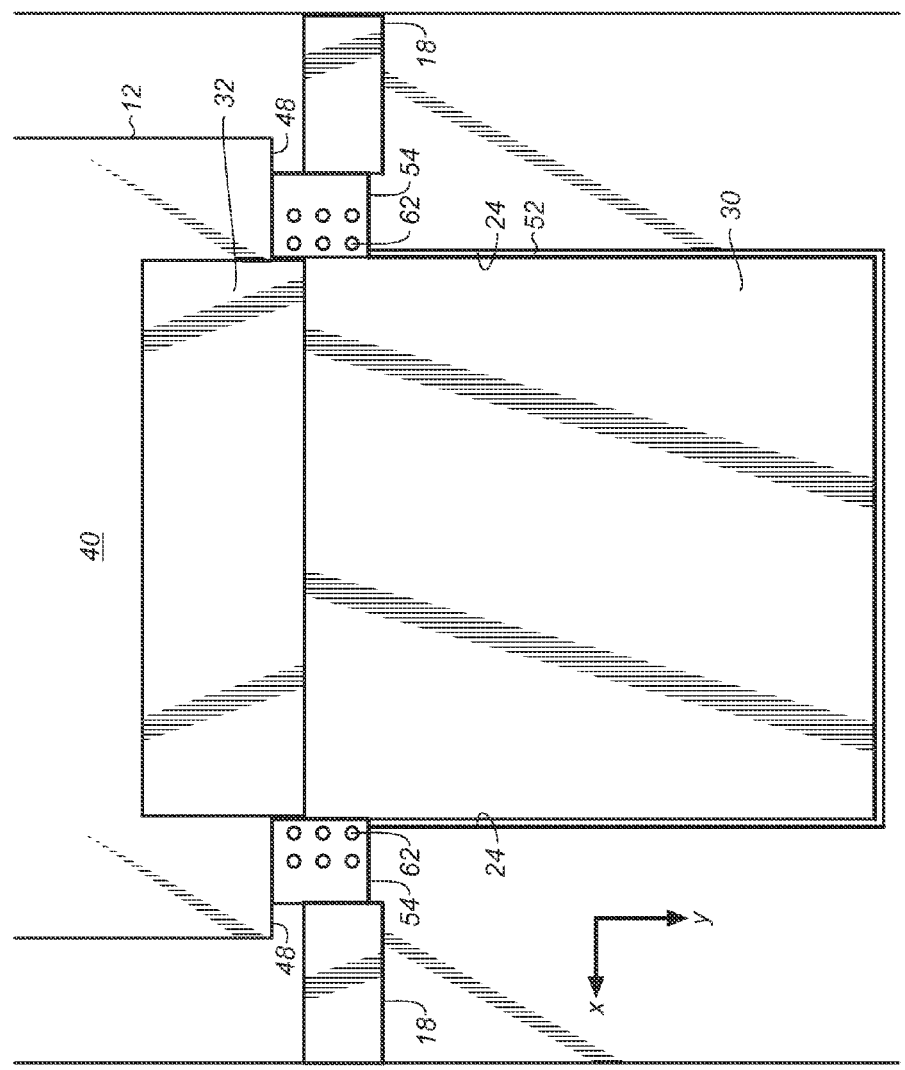
FIG. 7 is a top cross sectional view of the sealing device according to one embodiment of the invention, installed on the loading dock of FIG. 3.

Referring now to FIGS. 4-7, disclosed is one embodiment of a sealing device 54 that mitigates the potential leakage through the primary leakage zone 46 and, in some embodiments, the secondary leakage zone 50. FIG. 5 is a top perspective view of the sealing device 54, FIG. 6 is a bottom perspective view, and the installed sealing device 54 including proper orientation is shown in FIG. 4. The sealing device 54 includes at least three sealing surfaces: a bottom surface 56, an inner vertical surface 58, and a rear vertical surface 60. The bottom surface 56 is adapted for sealing engagement against the dock floor 14. In one embodiment the sealing device 54 is bolted to the dock floor 14.

The sealing device 54 may be formed of a resilient and flexible thermoplastic polymer. In one embodiment, the thermoplastic polymer may be molded to form a closed skin, forming an internal cavity thereby that may include a fluid. The term fluid is intended to be interpreted broadly so as to include liquids, gases, or mixtures of both. For example, the fluid may be water, glycol, air, nitrogen, or a gel. In one example, the fluid is compressed air.

In a further example, the sealing device 54 may be formed of a thermoplastic polymer that is homogeneous. By homogeneous, it is meant that the sealing device 54 is formed of a single material. In some embodiments, the sealing device 54 comprises a homogeneous thermoplastic polymer that forms a closed skin, thereby creating an internal cavity. The sealing device 54 may be formed by a rotational molding process (e.g., rotomolding or spin casting), in which a hollow mold is first created that defines the outer contours of the sealing device 54. A measured quantity of the thermoplastic polymer is placed in the mold, and the mold is then heated and rotated about multiple axes. As the temperature of the hollow mold increases, the thermoplastic material softens and adheres to the inner walls of the mold. The mold continues to rotate at all times during the heating phase in order to maintain an even thickness and to avoid sagging or deformation during the cooling phase. After cooling, the finished sealing device 54 is removed from the mold. The inventor has determined that a candidate material for the disclosed sealing device 54 is flexible polyvinylchloride having a thickness in the range of 0.08 to 0.25 inches (0.20 to 0.64 cm). Other candidate materials include low density polyethylene, and some high density polyethylenes including cross-linked polyethylene. A further candidate material is vinyl-impregnated nylon.

The sealing device 54 may include one or more strengthening members 62 to permit directional deformation of the sealing device. Directional deformation allows the sealing device 54 to compress or deflect in one axis while resisting compression or deflection in another axis. In one embodiment, the strengthening member 62 is a hollow cylindrical plastic tube formed into an eyelet passing through the sealing device 54. In the illustrated embodiment, the strengthening members 62 would restrict deflection of the sealing device 54 in the vertical z-axis, yet permit deflection in the lateral x-axis and longitudinal y-axis. In one example, bolts or similar fasteners (not shown) can pass through the hollow cylindrical tubes 62 to secure the sealing device 54 to the dock floor 14, thereby establishing an air-tight seal between the bottom surface 56 and the dock floor 14. Although not illustrated in the accompanying drawings, the strengthening members 62 could also include raised ribs formed on the skin or surface of the sealing device 54. The ribs could be aligned in such a manner so as to allow deformation in one axis while limiting deformation in another axis.

The bottom surface 56 may be defined by four edges. A first lateral portion 64 of the bottom surface 56 of the sealing device 54 extends beyond (e.g., overhangs) the pit side wall 24 and extends across the gap 52. A second lateral portion 66 of the bottom surface 56 opposes the first lateral portion 64, and in one embodiment extends approximately to the door frame 18. The bottom surface 56 is further defined by a first longitudinal portion 68 extending away from (e.g., overhanging) the dock floor 14 a distance farther than a plane defined by the contact surface of the dock bumper 36. A second longitudinal portion 70 opposes the first longitudinal portion 68 and extends into the loading dock area. The length that the second longitudinal portion 70 extends into the loading dock area depends on the degree of sealing needed along the gap 52. In some constructions, the gap 52 may already be sealed and therefore the length may be minimal, for example 1 foot. In other constructions, the gap is not sealed, and a leakage path with the outside environment may result in unacceptable drafts. The second longitudinal portion 70 could conceivably extend the entire length of the gap 52.

The sealing device 54 further includes an inner vertical surface 58 extending transversely (e.g., approximately perpendicular) from the first lateral portion 64 of the bottom surface 56. The inner vertical surface 58 is distanced in a lateral direction beyond the gap 52. In this manner and due to the resilient and flexible material, the inner vertical surface 58 is adapted to seal against the toe guard 34 when the dock leveler assembly 28 rises. In one embodiment, the first lateral portion 64 of the bottom surface 56 also extends beyond the gap 52.

The sealing device 54 further includes a rear vertical surface 60 extending transversely from the first longitudinal portion 68 of the bottom surface 56 and the inner vertical surface 58. That is, the rear vertical surface 60 is approximately perpendicular to the bottom surface 56 and forms a corner with the inner vertical surface 58. The rear vertical surface 60 is distanced in a longitudinal direction beyond a plane defined by the contact surface of the bumpers 36. In this manner and due to the resilient and flexible material, the rear vertical surface 60 is adapted to seal against the rear cargo frame 48 of the vehicle 12 when the vehicle backs into and engages the contact surface of the bumpers 36.

The sealing device 54 thus defines a sealing surface in each of the three axes. The bottom surface 56 provides sealing in the x-y plane, the inner vertical surface 58 provides sealing in the y-z plane, and the rear vertical surface 60 provides sealing in the x-z plane. Together, the sealing surfaces 56, 58, 60 block the primary leakage zone 46 identified by the inventor.

In some embodiments, the second lateral portion 66 of the bottom surface 56 extends to the door frame 18 of the loading dock 10. In this construction, the sealing device 54 may further include an outer vertical surface 72 joined to the second lateral portion 66 of the bottom surface, opposing the inner vertical surface 58. When the outer vertical surface 72 is in sealing engagement with the door frame 18, the secondary leakage zone 50 is blocked.

The sealing device 54 performs adequately with the three joined sealing surfaces 56, 58, and 60 and an open top. However, a closed structure provides additional benefits. Towards this end, the sealing device 54 may further include an upper surface 74 joining the inner vertical surface 58, the rear vertical surface 60, and the outer vertical surface 72. A forward portion 76 of the upper surface 74 may join to the second longitudinal portion 70 of the bottom surface 56, thus forming a wedge shape. The angled upper surface 74 prevents damage to the sealing device 54 when fork trucks, hand trucks, and the like collide into it.

Further, the upper surface 74 may be adapted for sealing engagement with the dock seal 38 or dock shelter. Because the rear vertical surface 60 juts out beyond the edge of the loading dock floor 14, a rear portion 78 of the upper surface 74 may be designed with sufficient vertical height to engage the bottom of the dock seal 38, such as that shown in FIG. 2. The sealing engagement with the dock seal 38 provides an additional measure of protection against undesirable drafts from the outside environment.

Other shapes and embodiments are contemplated, however, and the disclosed wedge is not intended to be limiting. For example, the upper surface 74 may form a downwardly-sloping curve instead of a straight angle. The curved surface would still provide the necessary collision protection.

In some embodiments, the sealing device 54 may be formed of a material that provides superior resistance to abrasion so the sealing surfaces withstand the rubbing against the dock leveler assembly 28 and the rear cargo frame 48 of the vehicle 12. In one example, the sealing device 54 is formed of an abrasion-resistant material. The abrasion resistance of the material, or resistance to wear, may be measured by a standardized test method such as Taber abrasion test ASTM D4060, which measures a plastic's weight loss when subjected to a weighted abrasion wheel. In one example, the weight loss of the material when subjected to ASTM D4060 testing is less than 5%. In another example, the weight loss of the material is less than 1%. In yet another example, the weight loss of the material is less than 0.5%. An exemplary material meeting an acceptable abrasion resistance value is the aforementioned flexible polyvinylchloride. Initial testing using flexible PVC material demonstrated superior resistance to the abrasive loads imparted to the seal structure by the trailer frame.

Figure 8:
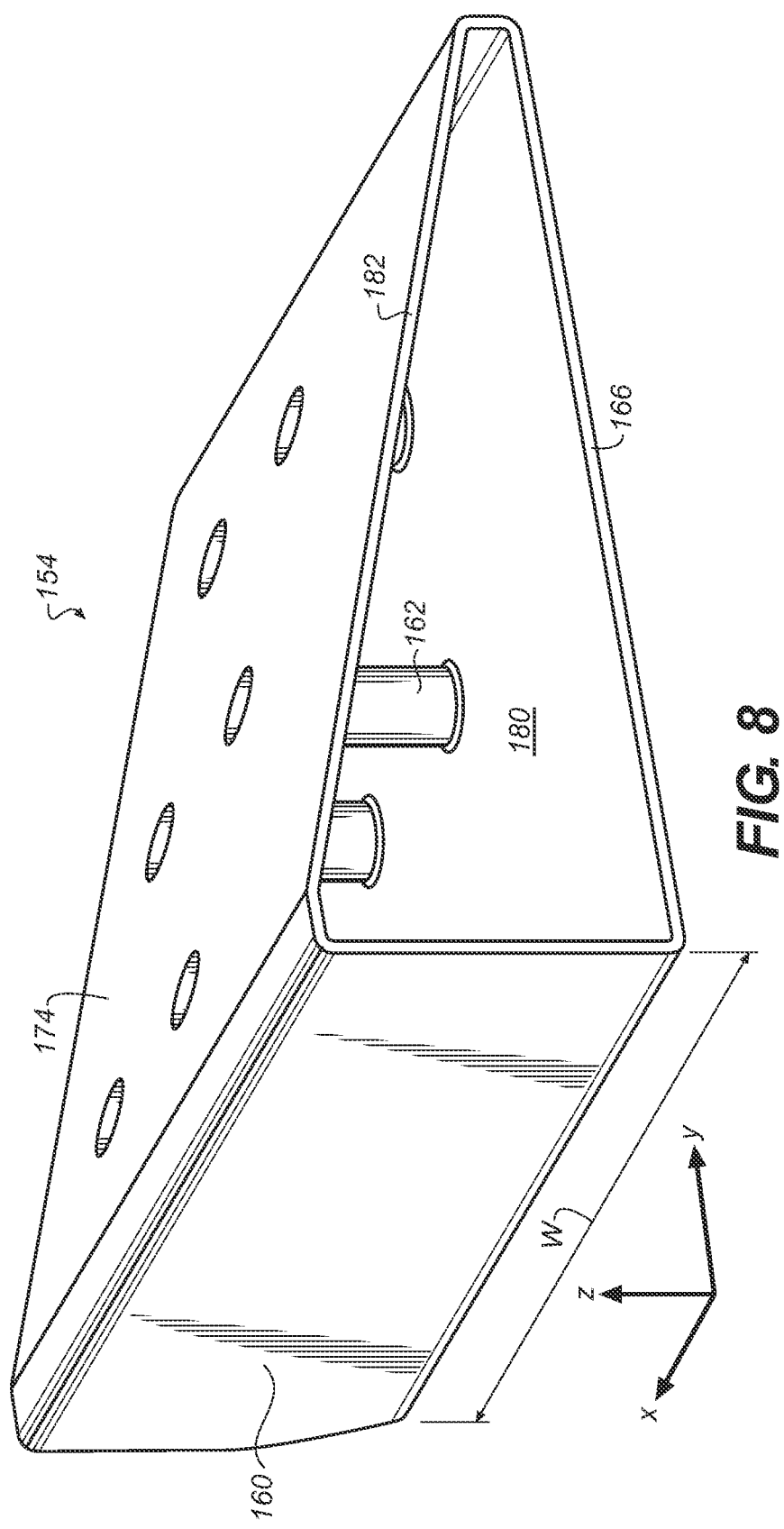
FIG. 8 is another top perspective view of the sealing device shown in FIG. 4.
Figure 9:
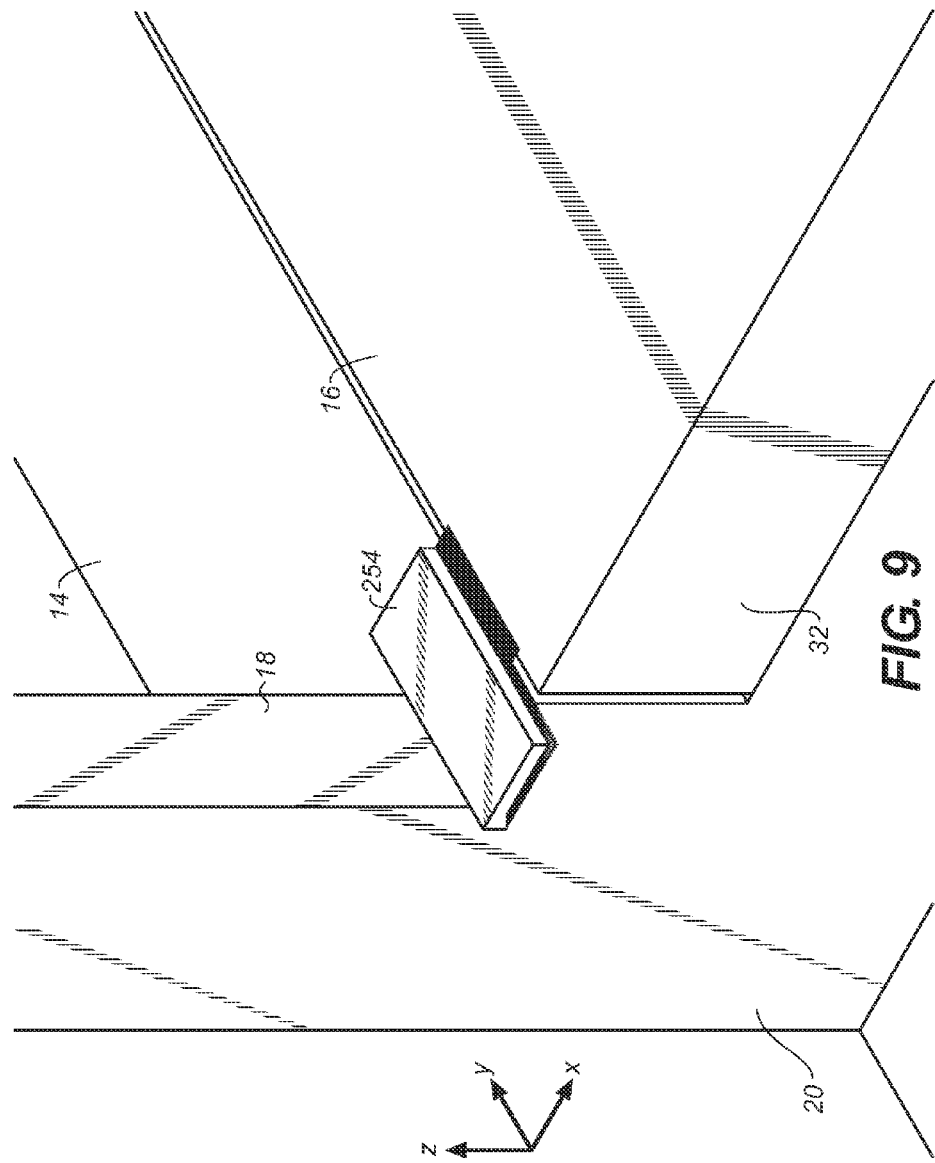
FIG. 9 is a top perspective view, from outside the building with the dock seal and bumper removed for clarity, of a sealing device according to another embodiment of the invention.
Figure 10:
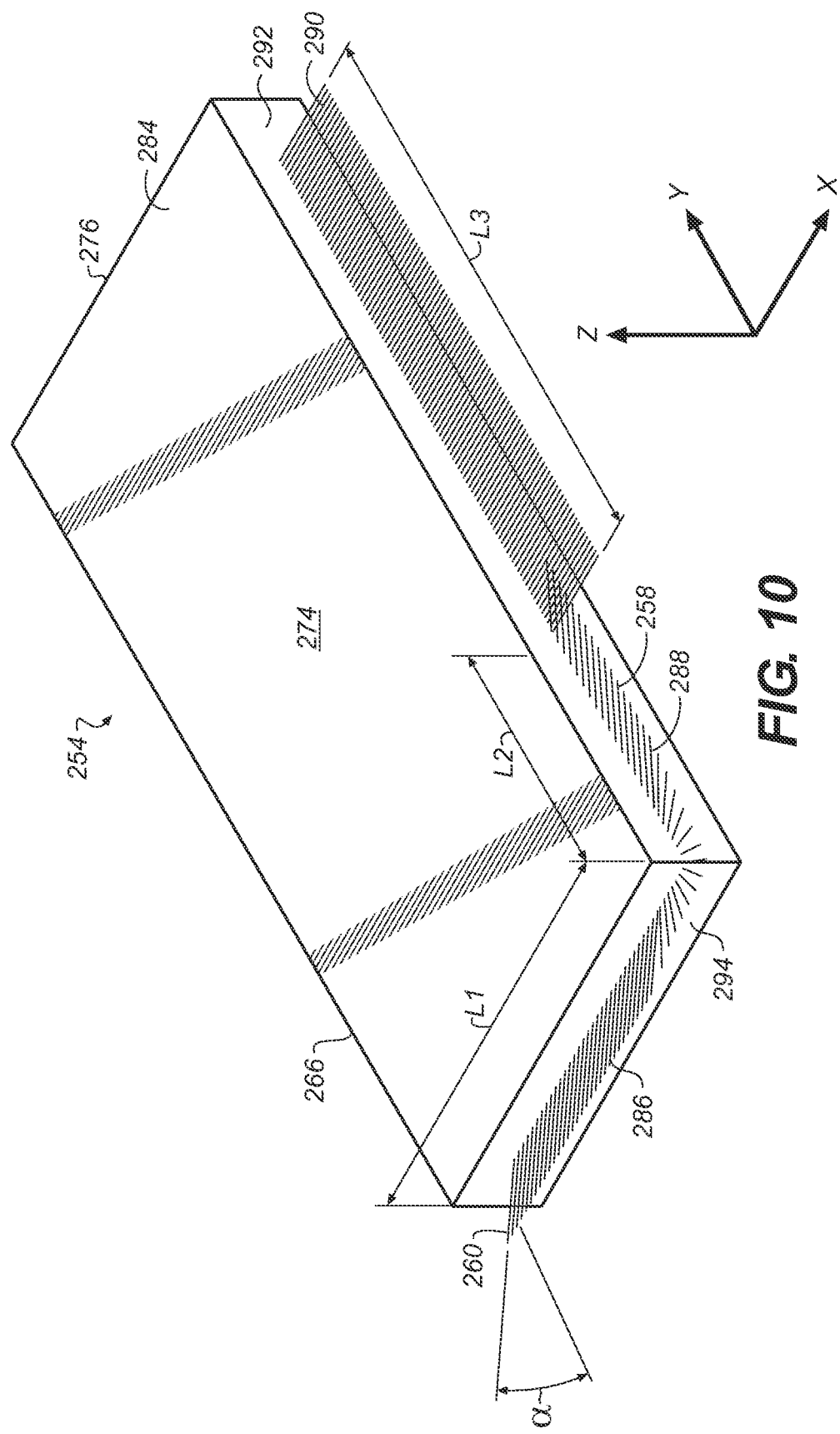
FIG. 10 is a top perspective view of the sealing device shown in FIG. 9.

Referring now to FIG. 8, a sealing device 154 is disclosed as having an internal cavity 180, as may result from a rotomolding operation. In one method of manufacture, the sealing device 154 is formed of a closed-cell structure having a lateral width at least two times that required for the finished piece. In other words, if the finished sealing device 154 requires a lateral width W as shown, the article of manufacture is formed with a width of at least 2×W. The article of manufacture is then sectioned into two halves by a slitting operation, for example. The resulting halves can be positioned so the open end on each sealing device 154 abuts the door frame. In this manner, the closed end is suitable for use as the inner vertical surface seal, and the outer skin 182 of the open end provides a suitable seal to the door frame wall. Positioning the open end in abutment with the door frame wall has a further advantage of eliminating a possible collection point for debris, litter, or rodent nests, which are highly undesirable if the loading dock is utilized for refrigerated foods and subject to government inspections.

In some embodiments, the internal cavity 180 further includes one or more strengthening members 162. The strengthening members 162 may be required to aide in the deflection of the inner vertical surface 158 or rear vertical surface 160, and/or to limit the degree of compression of the sealing device 154 in the vertical direction. In one example, the strengthening member 162 is foam, and may comprise a shaped solid block rather than the illustrated tubes. In some embodiments including a flexible polyvinylchloride forming a closed skin and internal cavity 180, the foam 162 may be inserted after the sealing device 154 is divided into two halves.

Figure 11:
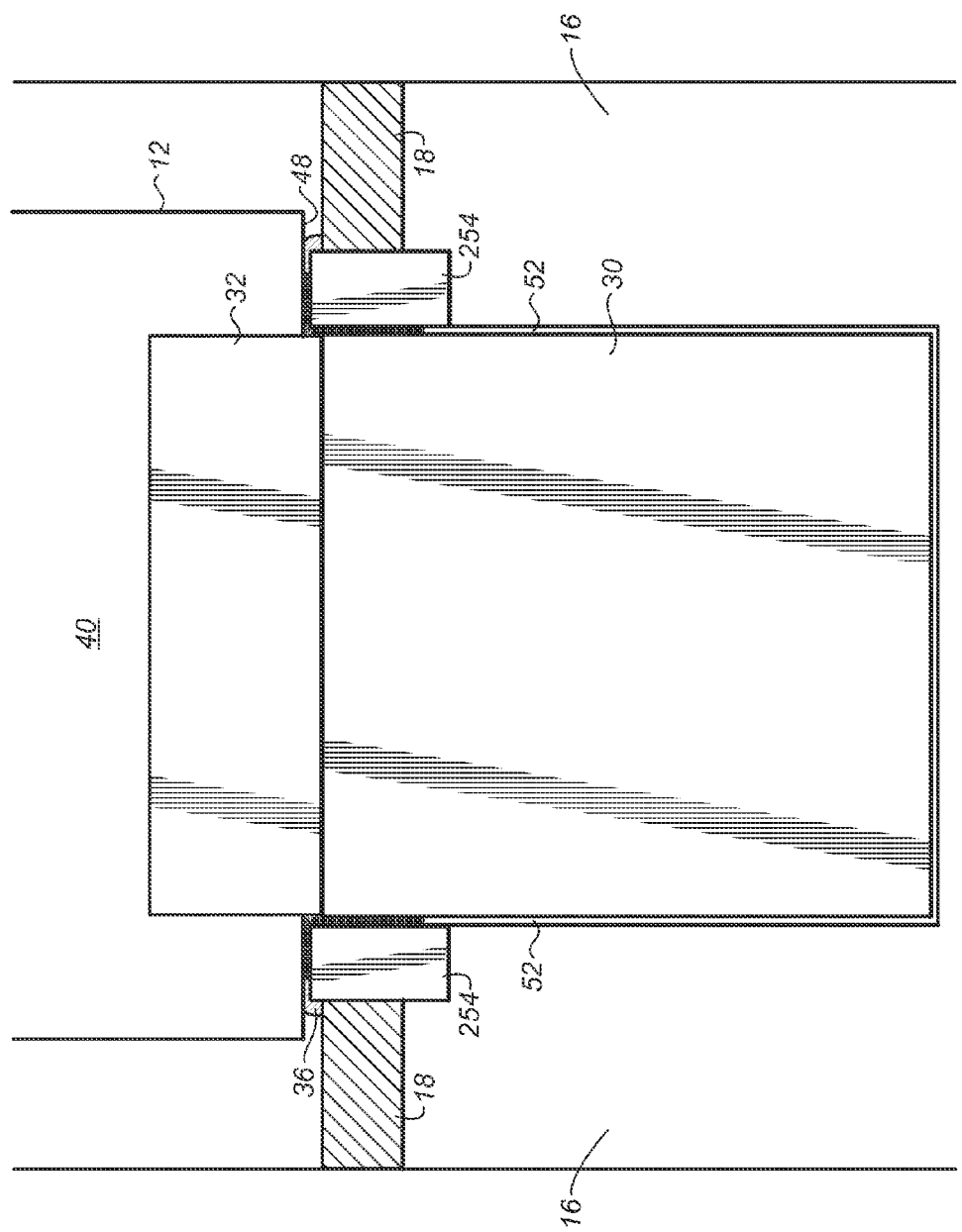
FIG. 11 is a top cross sectional view of the sealing device of FIG. 9, installed on the loading dock of FIG. 3.

Referring now to FIGS. 1, 2 and 9-11, shown is a sealing device 254 according to another embodiment of the invention. In this embodiment, the sealing device 254 includes a base portion 284, a first brush portion 286 and a second brush portion 288 secured to the base portion 284, and an optional third brush portion 290 secured to the base portion 284. The sealing device 254 may include at least three sealing surfaces. The first is a bottom surface 256 (obscured from view) of the base portion 284 adapted for sealing engagement against the dock floor 14. Unlike the sealing device 54 disclosed with reference to FIG. 5, the base portion 284 does not overhang the pit side wall 24. Rather, an inner face 292 of the base portion 284 may substantially align with the pit side wall 24 to prevent contact with the leveler assembly 28 when it raises and lowers. A rear face 294 of the base portion 284 may substantially align with the dock wall 20, or may overhang (as shown in FIG. 11), so long as it does not extend longitudinally farther out than the dock bumpers 36. A second lateral portion 266 opposing the inner face 292 of the base portion 284 may in some embodiments extend to the door frame 18.

In the illustrated embodiment, the base portion 284 is depicted as a rectangular block, having a flat upper surface 274 and a vertical forward portion 276. However, in other embodiments, the upper surface 274 of the base portion 284 may be sloped (similar to the sealing device 54 shown in FIG. 5) such that the vertical forward portion 276 is small or nonexistent (i.e., upper surface 274 joins bottom surface 256). This configuration may better withstand repeated hits from a forklift truck, for example.

The first brush portion 286 extends longitudinally away from the base portion 284, towards the vehicle. The second sealing surface comprises the tip or outer edge of the first brush portion 286, and is adapted to seal against the rear cargo frame 48 of the vehicle 12 when the vehicle backs into and engages the contact surface of the bumpers 36 (FIG. 11). In one embodiment, the first brush portion 286 includes a plurality of relatively stiff bristles extending over a lateral length L1. The length L1 may vary according to the particular geometry of the loading dock 10, but in any event will extend past the leakage zone 46 described in reference to FIG. 3. In this sense, the ends of the bristles form a rear vertical surface 260 for sealing engagement with the rear cargo frame 48. In some embodiments, the bristles of the first brush portion 286 extend past the secondary leakage zone 50. The bristles in the first brush portion 286 extend in a longitudinal direction beyond a plane defined by the contact surface of the bumpers 36. In this manner and due to the flexible nature of the bristles, the first brush portion 286 is adapted to seal against the rear cargo frame 48 of the vehicle 12 when the vehicle backs into and engages the contact surface of the bumpers 36.

In the illustrated embodiment, the first brush portion 286 includes a plurality of bristles that are angled upwardly from the horizontal axis (e.g., the y-axis) to facilitate engagement with the rear cargo frame 48. Arranging the bristles at an angle assures they will all conform to the rear cargo frame 48 in the same manner (e.g., all pointing upwards) to effectuate a proper seal. In one example, the bristles of the first brush portion 286 are at an angle α from the horizontal axis in the range of 10 degrees to 60 degrees. In another example, the bristles of the first brush portion 286 are angled upwards at an angle α in the range of 30 degrees to 50 degrees. In yet another example, the bristles of the first brush portion 286 are angled upwards at an angle α of approximately 45 degrees. In yet another example, the bristles of the first brush portion 286 are angled downward.

The second brush portion 288 extends laterally away from the base portion 284, towards the leveler assembly 28. The third sealing surface comprises the tip or outer edge of the second brush portion 288, and is adapted to seal underneath the dock leveler lip 32 when the lip is in its extended position (e.g., into the vehicle cargo area 40). In one embodiment, the second brush portion 288 includes a plurality of relatively stiff bristles extending over a longitudinal length L2. The length L2 may vary according to the particular geometry of the loading dock 10, but in any event will extend into the leakage zone 46 described in reference to FIG. 3 and along at least a portion of the loading dock lip 32. In this sense, the ends of the bristles form an inner vertical surface 258 for sealing engagement with the underside of the dock leveler lip 32. The bristles in the second brush portion 288 may extend around the corner of the base portion 284 and join with the bristles of the first brush portion 286, thereby forming one continuous brush portion.

In the illustrated embodiment, the second brush portion 288 includes a plurality of bristles that are upwardly angled at an angle α to facilitate engagement with the leveler lip 32. Angling the bristles assures they will all conform to the lip 32 in the same manner (e.g., all pointing upwards) to effectuate a proper seal. In one example, the bristles of the second brush portion 288 are angled upwards at an angle α in the range of 10 degrees to 60 degrees. In another example, the bristles of the second brush portion 288 are angled upwards at an angle α in the range of 30 degrees to 50 degrees. In yet another example, the bristles of the second brush portion 288 are angled upwards at an angle α of approximately 45 degrees. In yet another example, the bristles of the second brush portion 288 are angled downward. The bristles of the second brush portion 288 may be angled the same amount as the first brush portion 286.

The third brush portion 290 extends laterally away from the base portion 284, towards the leveler assembly 28. An optional fourth sealing surface comprises the tip or outer edge of the third brush portion 290, and is adapted to seal against the toe guard 34 when the dock leveler assembly 28 rises. In one embodiment, the third brush portion 290 includes a plurality of relatively stiff bristles extending over a longitudinal length L3. The length L3 may vary according to the particular geometry of the loading dock 10, but in any event will extend into the gap 52 described in reference to FIG. 3. In this manner, the inner vertical surface 258 and the third brush portion 290 may extend longitudinally into the loading dock 10 as far as desired to effect a good seal against the toe guard 34. The bristles in the third brush portion 290 may extend and join with the bristles of the second brush portion 288, thereby forming one continuous brush portion. In the illustrated embodiment, the third brush portion 290 includes a plurality of bristles that are extended horizontally and are not angled.

The base portion 284 may be formed of any material suitable for retaining the brush portions and sealing against the floor 14 of the loading dock. In one example, the base portion 284 is formed of ¾-inch ultra-high-molecular-weight (UHMW) polyethylene. The UHMW material can be bolted directly to the floor 14 of the loading dock. Preferably, the corners of the UHMW material are rounded to facilitate securement of the bristles.

In one example, the brush portions 286, 288, 290 comprise a plurality of relatively stiff bristles formed of extruded nylon or polyester. The bristles can be secured to the base portion 284 in a conventional manner such as stapling, where the middle of a bristle is forced with a staple into a hole using a special driver. The bristle is retained by pressure against the surface of the hole, and a portion of the staple nailed to the bottom of the hole. The bristles can also be secured to the base portion 284 by an adhesive, or by fusing or melting the filaments thereto.

In operation, the deck 30 of the leveler assembly 28 is initially horizontal and flush with the dock floor 14. The leveler lip 32 is folded and stored in a downward position, as shown in FIG. 2. When a vehicle 12 backs into the dock, the rear cargo frame 48 engages the bumpers 36 and the first brush portion 286 effects a seal against the rear cargo frame 48. The leveler assembly 28 is activated and deck 30 lifts upward, higher than the deck of the vehicle cargo area 40. The lip 32 then extends to an approximate horizontal position, the deck 30 is lowered, and the lip 32 comes to rest in the vehicle cargo area 40. As the deck 30 is lowered and comes to rest, the lip 32 engages the bristles of the second brush portion 288 to complete the sealing of the leakage zone 46.

In one embodiment, illustrated herein, the third brush portion 290 engages the toe guard 34 to effectuate a seal along the gap 52. Unlike prior art seals that attempted to seal the gap when the leveler assembly was in a stowed position, the second brush portion 288 and third brush portion 290 continue to maintain a seal even as the leveler is raised, a benefit not obtained in prior art designs.

Figure 12:
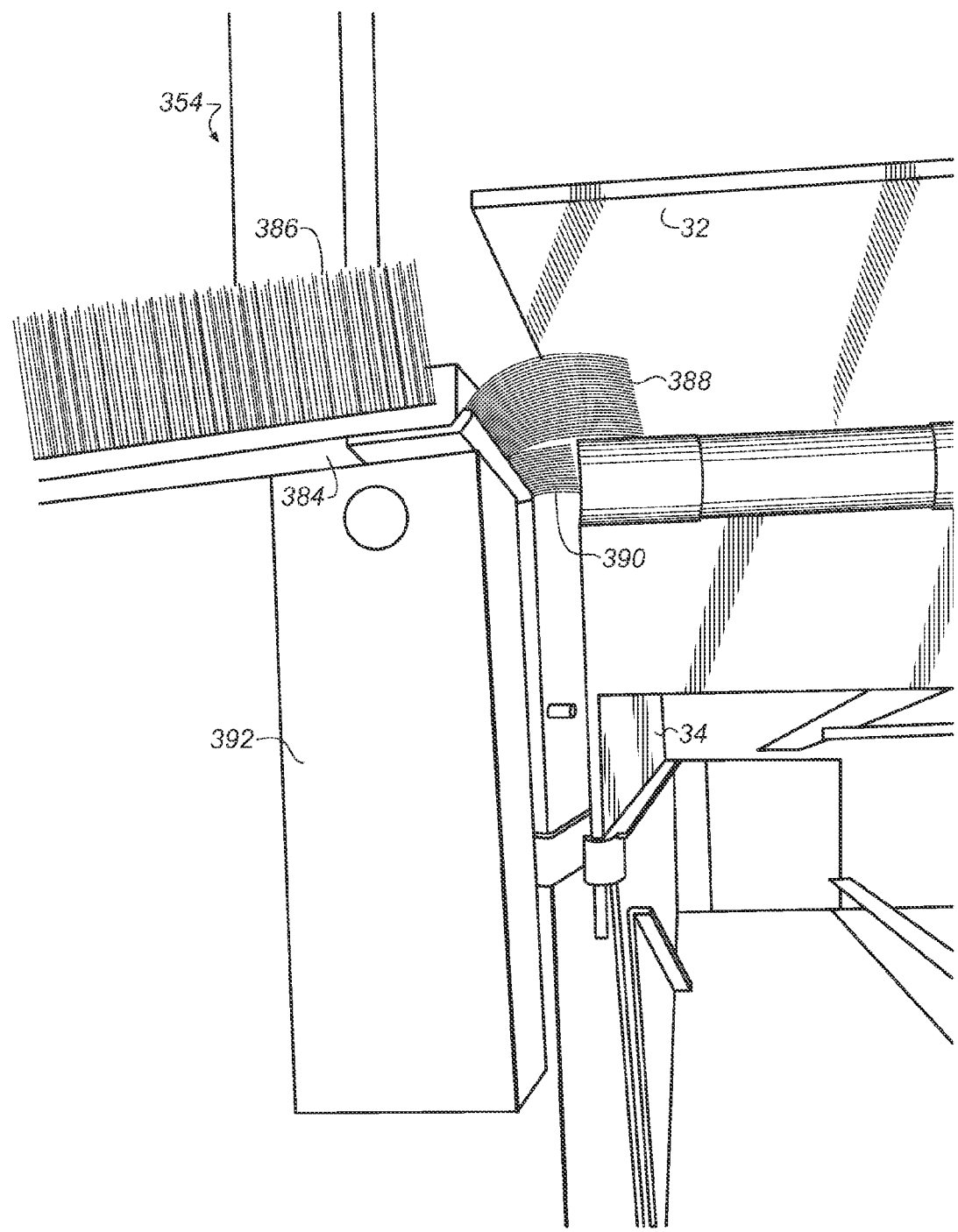
FIG. 12 is a bottom perspective view of a sealing device installed on a loading dock, according to another embodiment of the invention.

Referring to FIG. 12, pictured is a prototype of a sealing device 354 according to one embodiment of the present invention. The first brush portion 386 can be seen extending out from the loading dock wall. The dock bumper has been removed, but a mounting plate 396 for the bumper is visible. The base portion 384 of the sealing device 354 is arranged such that it would not extend farther out than the installed bumper. However, the bristles on the first brush portion 386 would extend farther out than the installed bumper. The bristles on the second brush portion 388 can be seen extending underneath the extended leveler lip 32, effectively sealing off the leakage zone 46 described in reference to FIG. 3. A third brush portion 390 can be seen extending from the base portion 384 and contacting the toe guard 34 of the leveler assembly.

Figure 13:
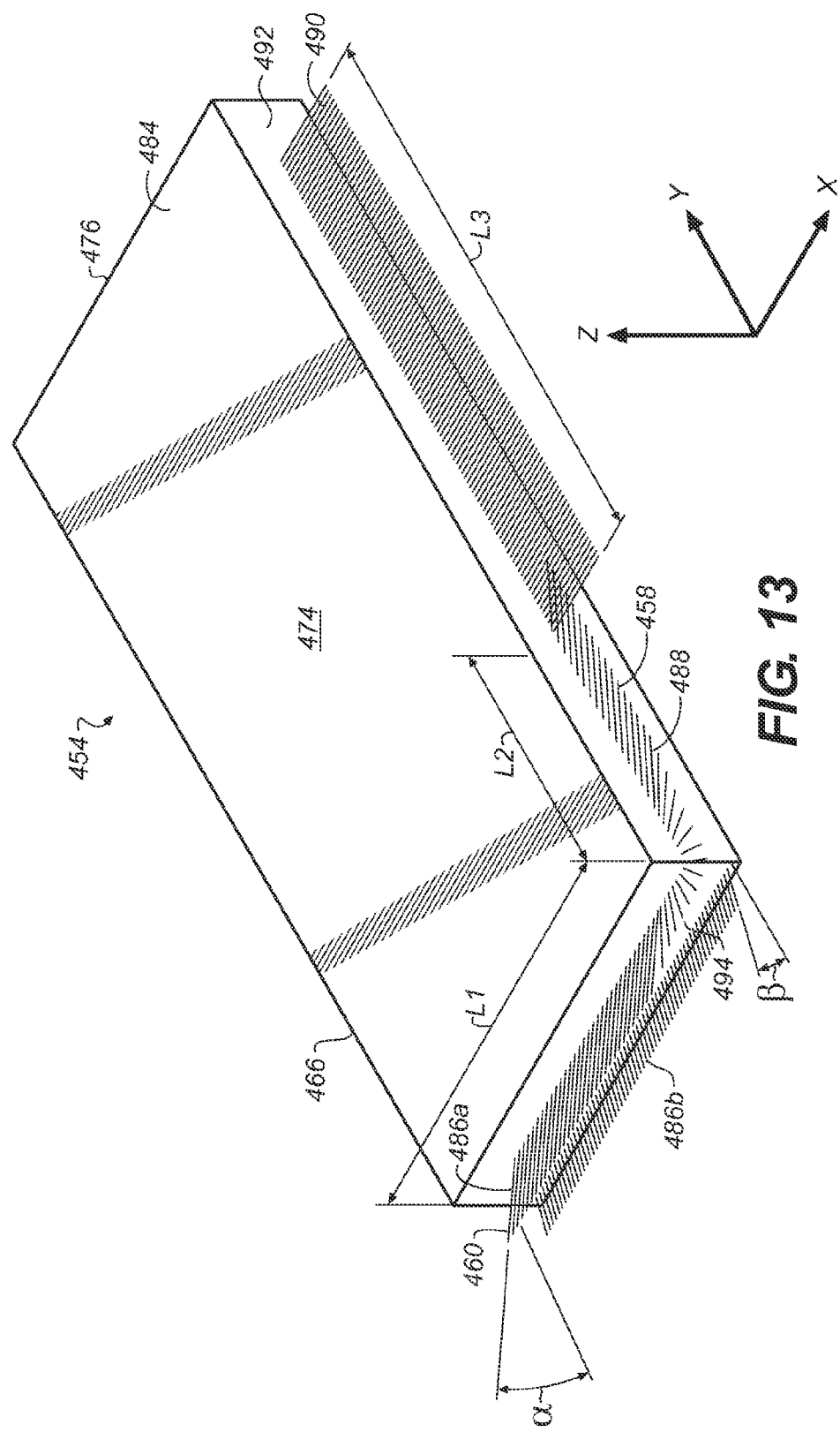
FIG. 13 is a top perspective view of a sealing device according to yet another embodiment of the invention.

Referring now to FIG. 13, a sealing device 454 according to another embodiment of the invention may include a plurality of brush rows. In this manner, first brush portion 486 includes a top row 486*a* of bristles and a bottom row 486*b* of bristles. The top row 486*a* may be configured and arranged substantially as described in reference to FIG. 10. That is, the bristles in the top row 486*a* may be angled upwardly from the horizontal (e.g., the y-axis) at an angle α in the range of 10 degrees to 60 degrees. The bristles in the bottom row 486*b* may be angled upwardly from the horizontal at an angle β in the range of 0 degrees to 30 degrees. In one example, the first brush portion 486 includes a first row of bristles 486*a* angled upwards at an angle α of approximately 45 degrees, and a second row of bristles 486*b* angled upwards at an angle β of approximately 5 degrees. In one aspect, providing a plurality of bristle rows at differing angles helps account for elevation variations in the numerous trucks using the loading dock. In another aspect, multiple rows provides better sealing capacity. In other embodiments, the second row of bristles 486*b* may be angled downwards.

In other examples (not illustrated), multiple rows of bristles could be utilized for the second brush portion 488 or the third brush portion 490. The second brush portion 488 could benefit from multiple rows of bristles due to the variation of leveler height in each truck parked at the dock and the concomitant difficulty in aligning the bristles with the underside of the leveler lip. In one example, where the leveler bed is sloped downward due to a low truck bed, a second row of brushes may beneficially angle downwards.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

A sample of devices and methods that are described herein are as follows:

In a loading dock comprising a floor, a door frame, a pit, a dock leveler assembly, and a dock bumper, the pit comprising a pit floor, pit side walls, and a pit rear wall, the dock leveler assembly comprising a deck, a lip connected to the deck, and a toe guard vertically coupled to the deck, the dock bumper extending longitudinally away from the floor, a sealing device for use in sealing a gap formed by the interface between the floor, the dock leveler assembly, and a parked vehicle cargo frame, the sealing device comprising:

a bottom surface in sealing engagement with the loading dock floor;

an inner vertical surface joined transversely to the bottom surface and adapted for sealing engagement with the toe guard when the dock leveler assembly is in a raised position; and a rear vertical surface joined transversely to the bottom surface and to the inner vertical surface, the rear vertical surface extending beyond a plane defined by a contact surface of the bumper, the rear vertical surface adapted for sealing engagement with the vehicle cargo frame.

The sealing device, further comprising an outer vertical surface opposing the inner vertical surface, the outer vertical surface joined to the bottom surface.

The sealing device, wherein the outer vertical surface extends to the door frame.

The sealing device, further comprising an upper surface joining the inner vertical surface, the rear vertical surface, and the outer vertical surface.

The sealing device, wherein the outer vertical surface is open-ended and the inner vertical surface is closed.

The sealing device, wherein a forward portion of the upper surface joins to the bottom surface.

The sealing device, wherein the upper surface is angled downward and the sealing device is wedge-shaped.

The sealing device, wherein the upper surface is curved downward.

The sealing device, wherein the upper surface, the inner vertical surface, the rear vertical surface, and the outer vertical surface are coupled to form a closed-cell structure.

The sealing device, wherein the closed-cell structure defines an internal cavity.

The sealing device, further comprising a strengthening member to permit directional deformation of the sealing device.

The sealing device, wherein the strengthening member is shaped foam.

The sealing device, wherein the strengthening member is a rigid tube.

The sealing device, wherein the sealing device is formed of a homogeneous thermoplastic polymer.

The sealing device, wherein the thermoplastic polymer is flexible polyvinylchloride.

The sealing device, wherein the sealing device is formed of a vinyl-impregnated nylon.

What is claimed is:

1. In a loading dock comprising a floor, a door frame, a pit, a dock leveler assembly, and a dock bumper, the pit comprising a pit floor, pit side walls, and a pit rear wall, the dock leveler assembly comprising a deck, a lip connected to the deck, and a toe guard vertically coupled to the deck, the dock bumper extending longitudinally away from the floor, a sealing device for use in sealing a gap formed by the interface between the floor, the dock leveler assembly, and a parked vehicle cargo frame, the sealing device comprising:

a base portion having a bottom surface, an inner vertical surface, and a rear vertical surface, the bottom surface adapted for sealing engagement with the loading dock floor;

a first brush portion secured to the rear vertical surface of the base portion, the first brush portion comprising a plurality of bristles and adapted for sealing engagement with the vehicle cargo frame; and a second brush portion secured to the inner vertical surface of the base portion, the second brush portion comprising a plurality of bristles and adapted for sealing engagement with an underside of the lip of the dock leveler assembly when the lip is in an extended position.

2. The sealing device of claim 1, further comprising a second lateral portion opposing the inner vertical surface, the outer vertical surface adapted to extend to the door frame.

3. The sealing device of claim 1, further comprising an upper surface joining the inner vertical surface and the rear vertical surface, wherein the upper surface is sloped downward.

4. The sealing device of claim 1, wherein the base portion is formed of an ultra-high-molecular-weight polyethylene.

5. The sealing device of claim 1, wherein the bristles of the first brush portion and the second brush portion are formed of nylon.

6. The sealing device of claim 1, further comprising a third brush portion secured to the inner vertical surface of the base portion, the third brush portion comprising a plurality of bristles and adapted for sealing engagement with the toe guard when the dock leveler assembly is in a raised position.

7. The sealing device of claim 1, wherein the bristles of the first brush portion are upwardly angled at an angle $\alpha$ to facilitate engagement with the rear cargo frame.

8. The sealing device of claim 7, wherein the angle $\alpha$ is in the range of 30 degrees to 50 degrees.

9. The sealing device of claim 1, wherein the bristles of the second brush portion are upwardly angled at an angle $\alpha$ to facilitate engagement with the rear cargo frame.

10. The sealing device of claim 9, wherein the angle $\alpha$ is in the range of 30 degrees to 50 degrees.

11. The sealing device of claim 1, wherein the plurality of bristles on the first brush portion joins with the plurality of bristles on the second brush portion.

12. In a loading dock comprising a floor, a door frame, a pit, a dock leveler assembly, and a dock bumper, the pit comprising a pit floor, pit side walls, and a pit rear wall, the dock leveler assembly comprising a deck, a lip connected to the deck, and a toe guard vertically coupled to the deck, the dock bumper extending longitudinally away from the floor, a method for sealing a gap formed by the interface between the floor, the dock leveler assembly, and a parked vehicle cargo frame, the method comprising the steps of:

providing a sealing device comprising a bottom surface, an inner vertical surface adapted for sealing engagement with an underside of the lip of the dock leveler assembly when the lip is in an extended position, and a rear vertical surface adapted for sealing engagement with the vehicle cargo frame;

effecting a first seal by positioning the bottom surface of the sealing device in sealing engagement with the loading dock floor;

positioning the vehicle cargo frame against the dock bumper;

effecting a second seal by engaging the inner vertical surface of the sealing device against the underside of the lip of the dock leveler;

effecting a third seal by engaging the rear vertical surface of the sealing device against the vehicle cargo frame; and providing a first brush portion extending longitudinally away from a rear face of the sealing device, the tip or outer edge of the first brush portion comprising the inner vertical surface providing the second seal.

13. The method of claim 12, wherein the step of effecting a second seal further comprises providing a plurality of brush rows.

14. The method of claim 12, wherein the step of effecting a second seal further comprises angling the first brush portion upwardly or downwardly from a horizontal axis.

15. The method of claim 12, further comprising the step of providing a second brush portion extending laterally away from an inner face of the sealing device, the tip or outer edge of the second brush portion comprising the rear vertical surface providing the third seal.

16. The method of claim 15, wherein the step of effecting a third seal further comprises angling the second brush portion upwardly or downwardly from a horizontal axis.

17. The method of claim 12, further comprising the steps of providing a third brush portion extending laterally away from the sealing device towards the dock leveler assembly, and effecting a fourth seal by engaging the tip or outer edge of the third brush portion against the toe guard when the dock leveler assembly rises.

18. The method of claim 12, wherein the steps of effecting a second and third seal comprise providing a continuous brush portion from a rear face of the sealing device to an inner face of the sealing device.

19. The method of claim 18, wherein the continuous brush portion is angled upwardly or downwardly from a horizontal axis.

* * * * *